United States Patent Office 3,233,101
Patented Feb. 1, 1966

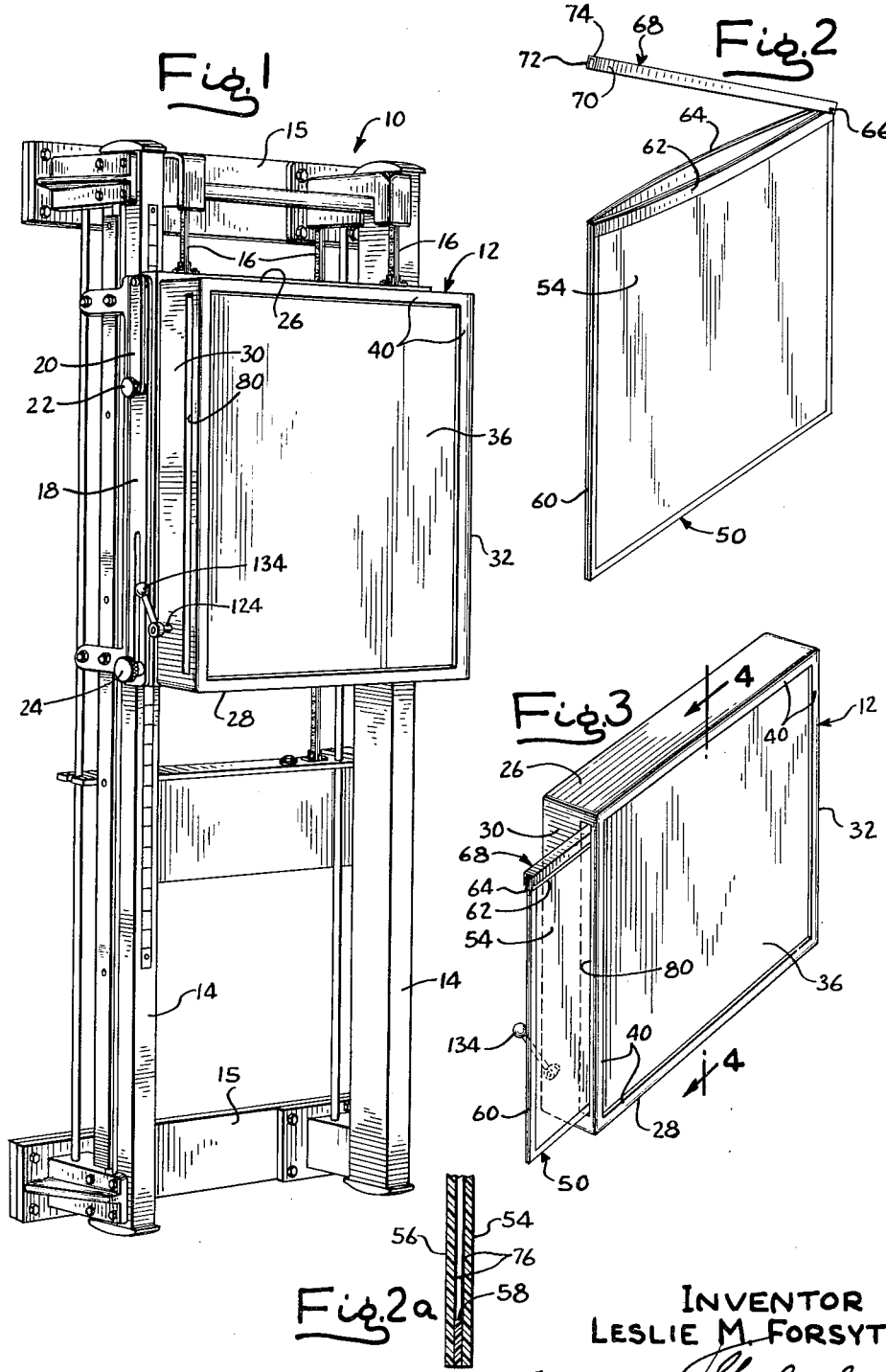

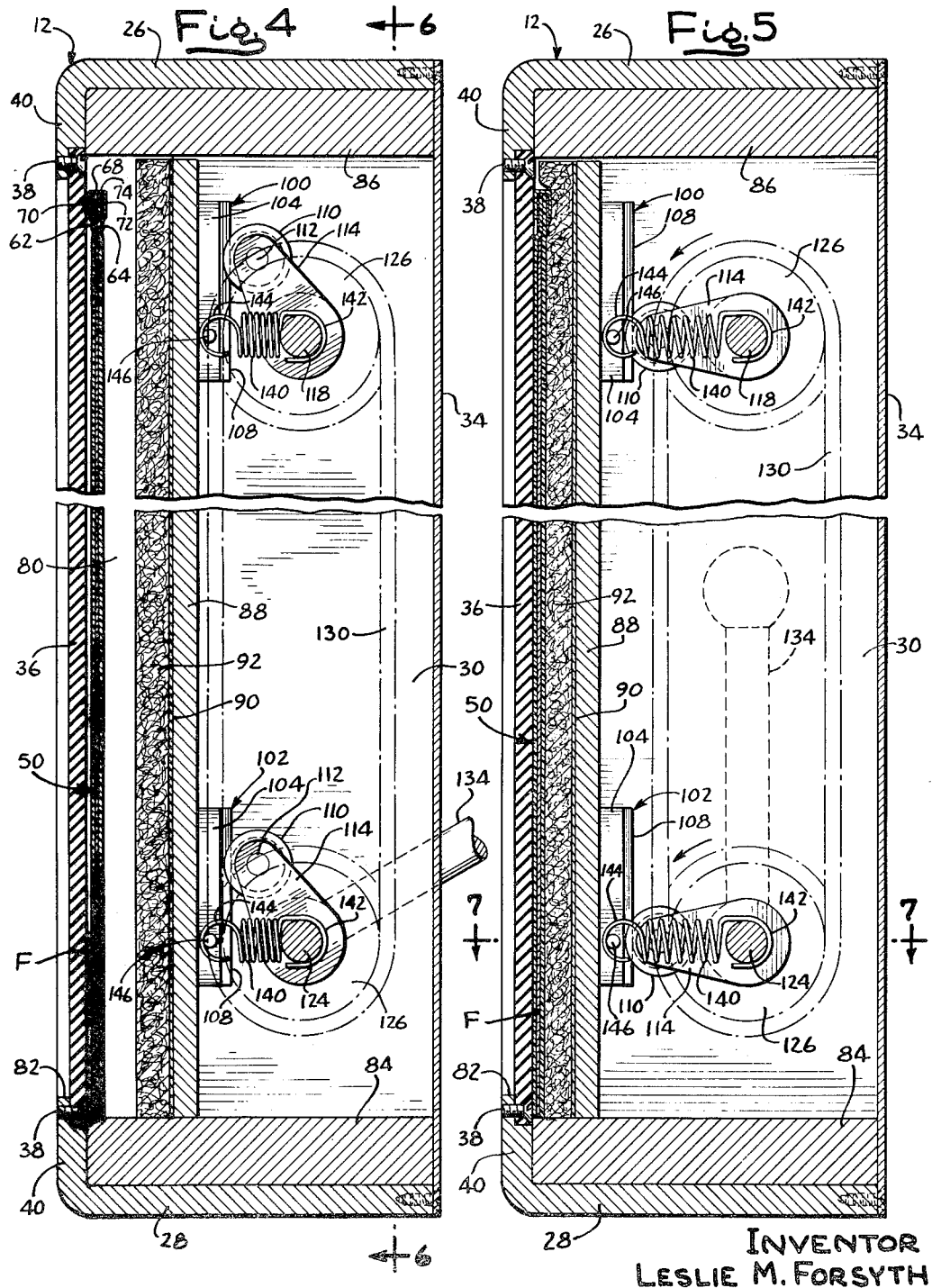

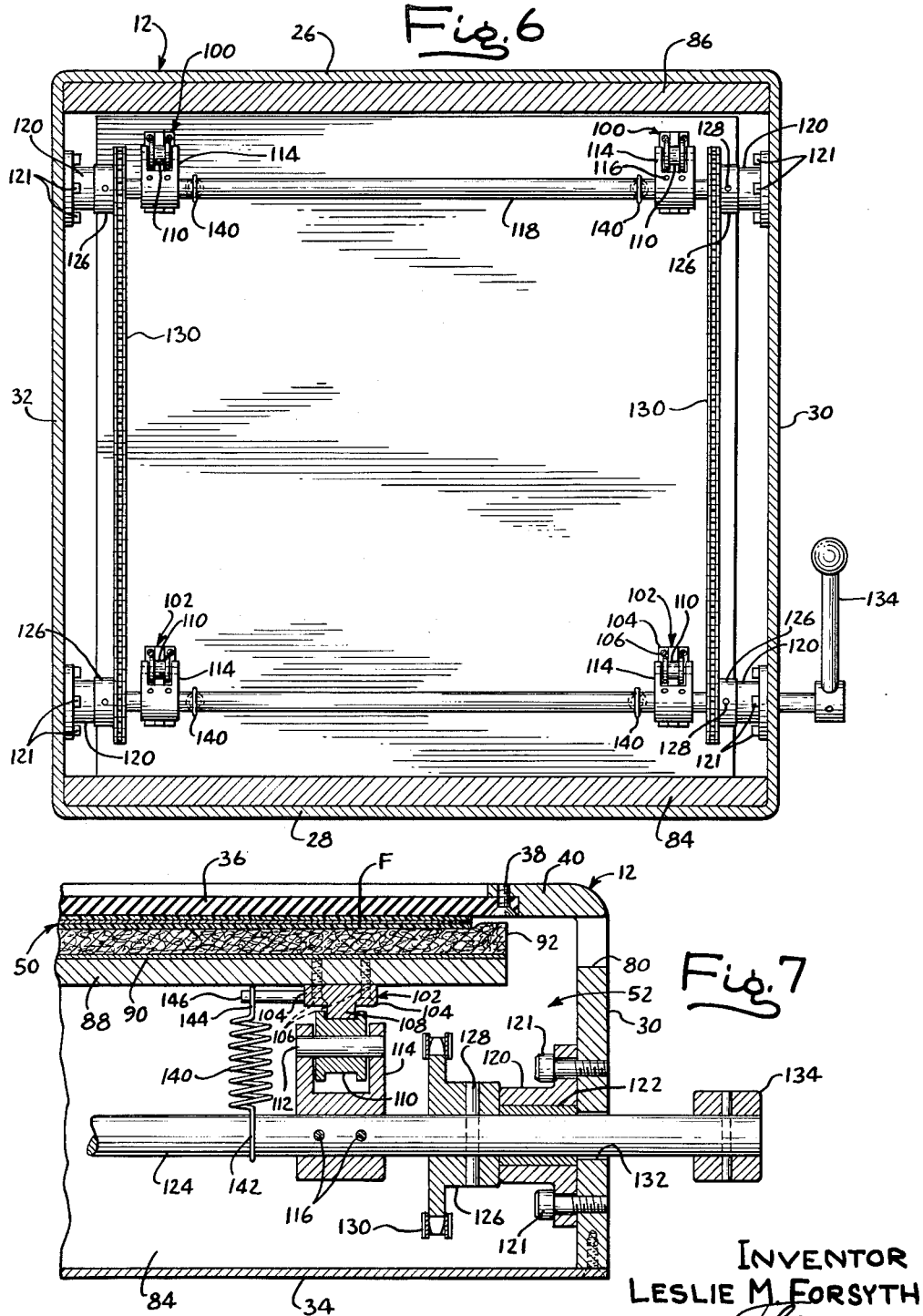

3,233,101
X-RAY FILM AND SCREEN EXPOSURE HOLDER WITH SEPARATE MEANS FOR APPLYING CONTACT PRESSURE THERETO
Leslie M. Forsyth, 2242 N. 73rd Ave., Elmwood Park, Ill.
Continuation of application Ser. No. 840,345, Sept. 16, 1959. This application Aug. 6, 1962, Ser. No. 215,486
6 Claims. (Cl. 250—68)

This application is a continuation of my United States patent application Serial No. 840,345, now abandoned, filed on September 16, 1959.

The present invention relates generally to X-ray photography and has particular reference to a novel form of X-ray film and screen holder, as well as to means whereby the holder with a film and its associated screens therein may be operatively mounted in various types of radiographic equipment, photographic machines or apparatus.

Present day X-ray film cassettes or exposure holders of the type which are designed for use in connection with radiographic equipment such as X-ray tables, radiographic tables, radiographic wall units, cassette changers and the like are possessed of numerous limitations, principal among which are the lack of uniform control, undue weight and thickness of the cassette units and the fact that adequate contact between the film and the usual intensifying screens on opposite sides of the film cannot be uniformly attained. Where hospital equipment is concerned, these cassettes are ordinarily handled by female personnel, and due to the fact that standard sized units weigh approximately eight pounds per unit, the operators frequently drop them and, furthermore, due to the fact that no more than a few of the units may be transported at the same time, numerous trips between the exposure room and X-ray development room must be resorted to. Because the cassette units are relatively thick, as well as heavy, storage space is at a premium and the temporary storage facilities at the scene of operations must be sturdily built at a convenient operating level and these facilities also consume much wall space. Much of the weight of conventional X-ray film and screen cassettes is attributable to the fact that these units contain their own pressure systems. In order to attain effective exposures, it is necessary that uniform and intimate contact of the X-ray sensitive material with its intensifying screen or screens within the cassette unit be attained. To accomplish this, each conventional cassette involves in its general organization a pressure plate, as well as a backing plate, together with springs or other yieldable means whereby the pressure plate may be forced toward the backing plate to compress the film and its associated intensifying screens into intimate coextensive face-to-face contact. One widely known and used pressure means for this purpose consists of one or more curved leaf springs centrally attached to the pressure plate and capable of having the free ends thereof inserted into slots within the cassette frame so that point pressure may be applied to the pressure plate to force it towards the backing plate. Due to the fact that only spot pressure is applied to the pressure plate by such springs, over-all intimate contact is not uniformly attained. Furthermore, to attain the necessary rigidity, both the pressure plate and the backing plate must be constructed of relatively thick material and the thicknesses of these plates, when added to the space that is required for the springs or other yieldable pressure means, very materially increases the over-all thickness of the cassette unit. Finally, the operations of such pressure means, i.e., the manipulations that are required to render the pressure means effective when the film is introduced into the cassette and to release the pressure means at the time the exposed film is withdrawn from the cassette, are cumbersome, require a considerable degree of skill, and consume an undue amount of time.

Another limitation that is attendant upon the construction and use of conventional cassettes resides in the high cost of these units, the simplest form of cassette in present-day commercial use costing upwards of thirty dollars, to which cost there is frequently added the cost of upkeep by way of repair when these units become damaged due to mishandling thereof or when the units otherwise fail to function properly.

The present invention is designed to overcome the above-noted limitations that are attendant upon the use of conventional cassettes, and toward this end, the invention contemplates the provision of a thin, flexible, lightweight envelope which, when the film is operatively installed therein, is opaque to light but transparent to X-rays, the thinness, flexibility and lightness being attained by divorcing, so to speak, the pressure system which is ordinarily associated with a conventional cassette from the present film and screen holder; and utilizing with the holder a separate pressurizing system in a radiographic wall unit, table unit, cassette changers or other piece of radiographic equipment.

The provision of a film holder of the character briefly outlined above being among the principal objects of the invention, another object of the invention is to provide such a film holder wherein the film may be operatively introduced into the holder and removed therefrom with a minimum of manipulation requiring no more skill than is required to introduce a sheet of paper into a conventional mailing envelope.

A further object of the invention is to provide a film holder of the aforementioned type and wherein the intensifying screen or screens to be associated with the film may be permanently associated with the holder so that the only handling required when installing the X-ray film into the holder and removing the film from the holder is the handling of the film itself.

A further object of the invention is to provide a film holder which may be manufactured at a small fraction of the cost of a conventional X-ray film cassette and, therefore, is disposable in the sense that when it has become worn to such an extent that its usefulness has been impaired, it may be discarded with no thought being given to the replacement of parts or repair.

Still another object of the invention is to provide a film holder which readily lends itself to economy of manufacture in that the materials which are employed and cooperate to make up the film holder are not costly, the use of plastic sheet material being contemplated for the construction of a major portion of the film holder.

Another object of the invention is to provide a novel form of pressure-applying means capable of being permanently associated with the radiographic equipment with which the film holder is to be employed and by means of which, when a film and screen holder is operatively installed in the equipment, will serve to compress the film holder in such a manner that intimate face-to-face contact between the film and its associated intensifying screen or screens is attained, while at the same time, the film is maintained in a generally plane condition for radiographic exposure. By thus divorcing the pressure system from the film holder, according to the present invention, it has been possible to devise a pressure system which is extremely effective since the problem of bulk is no longer a consideration and the pressure system of the present invention, therefore, is not limited to one which must be maintained within the narrow confines of a cassette, ample room being afforded for the use of separate mechanical devices which will attain far greater compressional forces than have hitherto been possible.

The provision of a film and screen holder which is of simple construction and comprises a minimum number of parts, particularly moving parts; one which is not subject to the accumulation of dirt or dust and may be easily wiped clean when necessary; one which is of such lightweight construction that a large number of similar holders may be transported by an individual at the same time; one which, despite its light weight, small proportions, and flexibility, is rugged and durable and, therefore, is possessed of a relatively long life; one which may be manipulated with comparative silence in that it is not subject to the usual noise and clatter associated with the handling of conventional cassettes containing metal parts, such as hinges, flaps, and the like; one which is attractive in its appearance and pleasing in its design; and one which otherwise is well-adapted to perform the services required of it, are further desirable features which have been borne in mind in the production and development of the present invention.

Other objects and advantages of the invention, not at this time enumerated, will be apparent from a consideration of the following detailed description.

In the accompanying three sheets of drawings forming a part of this specification, a preferred embodiment of the invention has been shown.

In these drawings:

FIG. 1 is a fragmentary front perspective view of a wall-mounted radiographic machine constructed in accordance with the principles of the present invention;

FIG. 2 is a perspective view of the improved X-ray film holder which is designed for use in connection with the radiographic machine of FIG. 1, such view showing the film holder in a partially opened condition;

FIG. 2a is an enlarged section through one marginal portion of the holder;

FIG. 3 is a perspective view of the radiographic unit proper showing the film holder of the present invention partially received therein;

FIG. 4 is an enlarged sectional view taken on the line 4—4 of FIG. 3 and in the direction indicated by the arrows;

FIG. 5 is a sectional view similar to FIG. 4 but showing the parts in a different position;

FIG. 6 is a vertical sectional view taken on the line 6—6 of FIG. 4; and

FIG. 7 is a fragmentary sectional view taken on the line 7—7 of FIG. 5.

Referring now to the drawings in detail, and in particular to FIGS. 1 to 3, inclusive, the improved film holder and pressurizing system therefor of the present invention have, purely for exemplary purposes, been illustrated as being operatively associated with an X-ray machine 10 of the wall-mounted radiographic type wherein the radiographic unit 12 is capable of vertical adjustment as well as of angular adjustment. The details of the wall mounting for the unit 12 constitute no part of the present invention and it may be stated briefly that the unit 12 is slidable vertically in a pair of guide rails or supports 14 on wall brackets 15, with the unit 12 being suspended in the usual manner by a pair of chains 16. The unit 12 is indirectly slidable on the rails 14 by means of a carriage 18 to which the unit is pivoted, allowance being made for fore-and-aft tilting movement of the unit 12 under the guidance of a linkage system 20. Locking devices 22 and 24 are provided for maintaining the unit 12 in any desired position of elevation or angular adjustment.

The radiographic unit 12 involves in its general organization a box-like framework or housing including parallel top and bottom walls 26 and 28 and parallel side walls 30 and 32. A panel 34 closes the rear side or back portion of the unit 12, while the front portion or side thereof is closed by a panel 36 which is removably secured by screws 38 to an inturned flange 40 at the front of the unit. The front panel 36 is formed of a suitable material which is impervious to light, but which will transmit X-rays therethrough. It is of rigid construction and constitutes, in effect, a fixed backing plate against which the film holder of the present invention is adapted to be forced in order properly to orient the associated X-ray film preparatory to making an exposure. Such a film holder has been illustrated in detail in FIG. 2 and designated in its entirety by the reference numeral 50. Operatively disposed within the box-like housing which comprises the unit 12 is a pressure-applying mechanism which is designated in its entirety by the reference numeral 52 and will be described in detail after the nature of the film holder assembly 50 upon which it is designed to operate has been described.

Referring now to FIGS. 2 and 3, and in particular to FIG. 2, the film holder 50 is generally in the form of a flat rectangular envelope including a front wall 54 and a rear wall 56, the two walls being secured together along three opposed surfaces thereof by means of three spacing strips 58 which are approximately of the thickness of an X-ray film F to be enclosed within the envelope. The three thicknesses of material may be secured together by a heat-sealing operation as indicated at 60. As shown in FIG. 2, the spacing strips are disposed between the bottom and side marginal portions of the front and rear walls of the holder 50. The material of the walls 54 and 56 and of the spacer strips 58 is preferably of a thermoplastic nature and is comprised of a substance which is impervious to light yet which is transparent to X-rays, a wide variety of suitable resinous or other thermoplastic or themosetting materials being available for use.

Suitably bonded to the upper margins of the front and rear walls 54 and 56 are two slightly bowed stainless flat spring steel strips 62 and 64, the bonding between the strips and the margins of the sheets or walls to which they are secured being coextensive from one end of each strip to the other. Pivotally secured to one upper corner of the rectangular envelope by a suitable pintle pin which may be in the form of a rivet 66, is a closure member 68 in the form of a spring steel channel strip which is capable of swinging movement between an open position such as has been illustrated in FIG. 2 wherein only the pivoted corner of the channel straddles the adjacent corner of the envelope, and a closed position wherein sides 70 and 72 straddle the spring strips 62 and 64 and cause them to remain in straight parallelism and in close proximity to each other within the web portion 74 of the channel strip closing the normally open top portion of the envelope.

The envelope constituting the film holder 50 may be constructed in standard sizes to accommodate standard sizes of X-ray film, the transverse dimensions of the envelope in either direction being only very slightly greater than the corresponding transverse dimensions of the film to be enclosed within the envelope. As previously stated, the thickness of the spacer strips 58 is substantially the same as the thickness of the X-ray film F so that when the film-loaded envelope is compressed under the influence of the pressure-applying mechanism 52, there will obtain a condition of flatness which is conducive toward intimate film and intensifier screen contact, as will be described presently.

It is within the scope of the present invention to employ individual intensifier screens which may be inserted loosely within the envelope so that they will assume positions on opposite sides of the X-ray film F, or such screens may be bonded to the inside faces of the front and rear walls 54 and 56. Preferably, however, the inside faces of the walls 54 and 56 are coated with the fluorescent intensifier screen material prior to assembly of the envelope, such coatings being represented in the drawings by the heavy lines 76 in FIG. 2a.

Referring now to FIGS. 4 to 7, inclusive, wherein the details of the pressure-applying mechanism 52 are best illustrated, the side wall 30 of the housing has formed therein an elongated vertical slot 80, through which the assembled film holder with the X-ray film F contained therein may be introduced into and removed from the unit 12. The slot 80 is disposed immediately rearwardly of the inturned flange 40 so that when the film holder 50 is passed through the slot and into the unit 12, it will assume a position immediately behind the front panel 36 and in accurate register with the rectangular opening 82 (see FIG. 4) which is afforded by the front flange 40. When the envelope-type holder is in place in the unit 12, the lower edge thereof is supported on a bottom piece 84 which is carried on the bottom wall 28, and with the upper edge of the holder underlying a top piece 86 on the inside of the top wall 26.

Loosely mounted within the housing constituting the unit 12 is a pressure plate assembly including a rigid, horizontally movable pressure plate 88 with a lead facing 90. Bonded or otherwise secured to the lead facing 90 is a pad 92 of material having an appreciable degree of resiliency, as, for example, sponge rubber or felt. The pressure plate 88, the facing 90, and the pad 92 are of rectangular configuration and the over-all dimensions of the fixed backing plate 36. The lower edge of the pressure plate assembly is slidably supported on the upper surface of the bottom piece 84 and the assembly is movable rectilinearly between the retracted position in which it is shown in FIG. 4 wherein it is clear of the film holder 50, and the advanced position in which it is shown in FIG. 5 wherein the resilient pressure pad 92 engages the film holder and compresses it against the fixed backing plate 36.

The material from which the fixed backing plate 36 is formed may vary, but it has been found that the material which is known as Bakelite is admirably adapted for use in connection with the backing plate 36 on account of the rigidity and strength of this material and the fact that Bakelite is impervious to light and transparent to X-rays. The movable pressure plate 88 may be constructed of magnesium since this material is extremely light in weight yet of sufficient rigidity and strength to serve the purpose for which the pressure plate 88 is intended.

The pressure plate assembly also includes or comprises a rectangular series of four rail sections including two upper rail sections 100 and two lower rail sections 102. Each rail section is disposed adjacent to one corner of the pressure plate 88 and is in the form of a metallic strip of T-shaped cross section (see FIG. 7). In addition, each rail section includes side flanges 104 which are secured by screws 106 to the rear face of the plate 88, and also includes a raised rail portion 108. The four rail sections 100 are designed for respective engagement with four double-flanged rollers 110, each roller being rotatably mounted on a cross pin 112 which is carried at the distal end of a bifurcated crank arm 114. Two of the crank arms 114 are pinned as at 116 on the end portions of a horizontally extending upper driven rock shaft 118 which extends across the interior of the housing of the unit 12 and is disposed between the side walls 30 and 32. Such rock shaft is rotatably journalled in bearing supports 120 which are secured by clamping bolts 121 to said side walls. The bearing supports 120 include anti-friction bushings 122. The other two crank arms 114 are similarly mounted on a lower driving rock shaft 124 which is similarly secured in bearing supports 120 on the housing side walls 30 and 32. Four sprocket wheels 126, one adjacent to each bearing support 120, are mounted on the driving and driven rock shafts and are pinned thereto as at 128. The two sprocket wheels 126 on the upper driven rock shaft 118 are vertically aligned with the two sprocket wheels 126 on the lower driving rock shaft and the thus aligned pairs of sprocket wheels are operatively connected together by sprocket chains 130. The chains 130 present practically no slack so that the turning movements of the driving rock shaft 124 are accurately translated into corresponding turning movements of the driven rock shaft 118. One end of the driving rock shaft 124 extends completely through an opening 132 in the housing side wall 30 and carries a radially extending manipulating handle 134 whereby the driving rock shaft may be turned or rocked from outside the unit 12.

As best seen in FIGS. 4, 5 and 7, the movable pressure plate assembly is yieldingly and normally maintained in its retracted position wherein the pad 98 is out of engagement with the envelope-type film holder 50 by means of a rectangular series of four coil springs 140. Two of the springs have certain ends thereof looped as at 142 around the upper rock shaft 118 and their other ends looped as at 144 around pins 146 on the upper rail sections 100. The other two coil springs 140 are similarly connected to the lower rock shaft 124 and the lower rail sections 102.

It is to be noted that the flanged rollers 110 are in horizontal register with the rails 100 and 102 with which they cooperate and that the springs 140 at all times serve yieldingly to urge the rails into follower relation with respect to the rollers 110. Thus, after the envelope-type film-containing holder 50 has been inserted into the housing of the unit 12 through the slot 80, the handle 134 will be turned in a clockwise direction, as seen in FIG. 1, or in a counterclockwise direction as viewed in FIGS. 3 and 4 so that the lower rock shaft 124 will be similarly turned. The counterclockwise rotation of the shaft 124 will be translated to the upper rock shaft 118, and upon turning movement of both shafts, the crank arms 114, operating somewhat in the manner of toggle links, will be swung in a counterclockwise direction in unison so that the rollers 110 carried thereby will be swung forwardly and downwardly as indicated by the arrows in FIG. 5. The forward vectorial component of motion which is thus applied to the rollers 110 will serve to force the rail sections 100 and 102 in unison forwardly, thus applying forward thrust to the movable pressure plate 88 to the end that the resilient pressure pad 98 affixed thereto will be moved forwardly into intimate face-to-face contact with the film holder 50 and the latter, in turn, will be compressed flatly against the front backing plate 36, as clearly shown in FIG. 5.

It is to be further noted that each rail section 100 and 102 serves to distribute the pressure exerted by its respective pressure-applying roller over a wide surface area at the adjacent corner region of the pressure plate 88. The pressure areas on the plate 88 are widely separated so that the plate will be moved uniformly forwardly into engagement with the film holder and, thereafter, the film holder will be evenly compressed against the front backing plate 36 whereby the X-ray film F and the intensifier screens 76 will be forced into intimate coextensive face-to-face contact. After the X-ray exposure has been made, it is merely necessary to swing the manipulating handle 134 in a clockwise direction as viewed in FIGS. 4 and 5 whereupon the rollers 110 will be swung bodily rearwardly and the film holder 50 released so that it may be withdrawn from the unit 12 through the slot 80, as illustrated in FIG. 3.

While there have been shown and described and pointed out the fundamental novel features of the invention as applied to a preferred embodiment thereof, it will be understood that various omissions and substitutions and changes in the form and details of the illustrated parts and in their operation may be made by those skilled in the art without departing from the spirit or scope of the invention. It is the intension, therefore, to be limited only as indicated by the scope of the following claims.

Having thus described the invention what I claim as new and desire to secure by Letters Patent is:

1. A portable X-ray film holder for use in radiographic equipment, said film holder comprising, in combination, a flat rectangular envelope comprised of two sheets of flexible material which is opaque to light and transparent to X-rays, said sheets being disposed in face-to-face contiguity and being sealed, each to the other, along three side edges thereof, the fourth side edges of said sheets being separable to provide an opening through which a flat sheet of X-ray sensitive material may be introduced into the envelope, a pair of oppositely bowed flat steel leaf springs secured substantially coextensively to the fourth side edges respectively with the end regions of the springs being maintained in substantial contiguity and with the medial regions of the springs being normally spaced apart, said springs normally biasing said fourth side edges outwardly away from each other to maintain said opening open, and a sealing strip of channel-shape cross section for compressing said fourth side edges together coextensively to close the opening, said sealing member including a pair of side flanges connected together by a web portion, the side flanges at one end of the sealing strip straddling said fourth side edges, and a hinge pin extending through said side flanges and sheets at one end of the sealing strip whereby the strip is movable between an open position wherein a major extent of the side flanges are out of contact with the sheets and a closed position wherein said side flanges straddle the sheets and springs and effectively engage said fourth side edges to compress the same against each other.

2. A portable X-ray film holder as set forth in claim 1 and wherein the inside face of at least one of said sheets have permanently and fixedly applied thereto a covering of fluorescent material constituting an intensifier screen.

3. In a radiographic unit, a substantially closed box-like housing having opposed side walls, one of which is formed with an elongated slot therein for reception therethrough of a flat, flexible, envelope-type, X-ray film and screen holder which is adapted to be introduced into the housing for exposure purposes and removed from the housing after exposure thereof has been effected, a front panel extending between said side walls and constituting a fixed backing plate for the holder, said panel being formed of a material which is transparent to X-rays, a movable pressure plate disposed between said side walls and movable in a straight line path normal to the plane of the backing plate and between a retracted position wherein it is remote from the fixed backing plate and an advanced position wherein it is in substantial face-to-face contiguity with said backing plate so that the holder, when interposed between the backing plate and the pressure plate, may be compressed therebetween, means yieldingly urging said pressure plate toward its retracted position, a pair of spaced, parallel rock shafts extending between said frame side members on the side of the pressure plate remote from said backing plate, said rock shafts having their ends rotatably journalled and supported by said side walls, a crank arm mounted on and movable bodily with each rock shaft, said crank arms, upon turning movement of the rock shafts in one direction, exerting forward thrust on the movable pressure plate at spaced regions thereon for forcing the plate forwardly toward said backing plate, means operatively connecting said rock shafts for turning movement in unison, and means for applying turning movement to one of said rock shafts.

4. A radiographic machine comprising, in combination, a supporting structure, a substantially closed, box-like housing mounted on and forming a part of the supporting structure and comprising top, side and bottom walls, and a flat, rectangular front panel extending between and fixedly connected to the front margins of said walls, constituting a fixed backing plate, and formed of a material that is transparent to X-rays, a unitary, comparatively thin, rectangular, flexible, envelope-type holder adapted to contain an X-ray film and consisting of flexible and coextensive front and rear walls having three opposed marginal portions connected together and in sealed relation and their fourth opposed marginal portions disconnected in order to form an access opening whereby the film may be inserted between the front and rear walls and then, after exposure, removed from the holder, one of the aforesaid walls of the housing having formed therein a narrow, elongated, longitudinally extending slot located directly rearwards of the front panel, shaped substantially correspondingly to the cross-sectional shape of the holder and adapted to have the holder inserted through it into a film-exposing position wherein it fits loosely against said front panel and then withdrawn through it after exposure of the film, a flat pressure plate disposed in the housing behind the front panel and movable back and forth between an advanced position wherein it serves when the holder is in place in the housing to compress the holder and its contained X-ray film flatly and firmly against the front panel and a retracted position wherein it is remote from the front panel and releases the holder for removal purposes, and pressure-applying means disposed in the housing and operative in connection with actuation thereof to move the pressure plate forwards into its advanced position.

5. A radiographic machine as set forth in claim 4 and including, additionally, spring means yieldingly urging the pressure plate towards its retracted position.

6. A radiographic machine as set forth in claim 4 and wherein the movable pressure plate is provided with a substantially coextensive sheet of lead.

References Cited by the Examiner

UNITED STATES PATENTS

| Re. 25,079 | 11/1961 | Kollock | 250—68 |
| 2,056,279 | 10/1936 | Kulick | 250—68 |
| 2,196,063 | 4/1940 | Engel | 250—66 |
| 2,359,582 | 10/1944 | Powers | 250—66 |
| 2,769,095 | 10/1956 | Forrer et al. | 250—68 |

RALPH G. NILSON, *Primary Examiner.*